United States Patent
Dantler et al.

(10) Patent No.: US 12,467,771 B2
(45) Date of Patent: Nov. 11, 2025

(54) ROTARY ENCODERS

(71) Applicant: ams-OSRAM Asia Pacific Pte. Ltd., Singapore (SG)

(72) Inventors: Markus Dantler, Eindhoven (NL); Laurent Nevou, Eindhoven (NL); Jens Geiger, Eindhoven (NL); Markus Rossi, Eindhoven (NL); Ferran Suarez, Eindhoven (NL)

(73) Assignee: AMS-OSRAM ASIA PACIFIC PTE. LTD., Singapore (SG)

( * ) Notice: Subject to any disclaimer, the term of this patent is extended or adjusted under 35 U.S.C. 154(b) by 143 days.

(21) Appl. No.: 18/282,511

(22) PCT Filed: Mar. 16, 2022

(86) PCT No.: PCT/SG2022/050143
§ 371 (c)(1),
(2) Date: Sep. 15, 2023

(87) PCT Pub. No.: WO2022/197250
PCT Pub. Date: Sep. 22, 2022

(65) Prior Publication Data
US 2024/0044674 A1 Feb. 8, 2024

Related U.S. Application Data

(60) Provisional application No. 63/162,451, filed on Mar. 17, 2021.

(51) Int. Cl.
*G01D 5/347* (2006.01)
(52) U.S. Cl.
CPC .................. *G01D 5/3473* (2013.01)
(58) Field of Classification Search
CPC ...... G01D 5/3473; G01D 5/347; G01D 5/345; G01D 5/2497; G01D 5/34746; G01D 5/38;
(Continued)

(56) References Cited

U.S. PATENT DOCUMENTS 4,829,342 A * 5/1989 Nishimura ............... G01D 5/38
250/237 G
4,868,385 A * 9/1989 Nishimura ............... G01D 5/38
250/237 G
(Continued)

FOREIGN PATENT DOCUMENTS

CN 107850468 A * 3/2018 ............. G01D 5/345
DE 102006042972 A1 * 3/2007 ............. G01D 5/366
(Continued)

OTHER PUBLICATIONS

International Search Report issued for corresponding International Patent Application No. PCT/SG2022/050143 on Jun. 17, 2022 (4 pages).
(Continued)

*Primary Examiner* — Mohamed K Amara
(74) *Attorney, Agent, or Firm* — VIERING, JENTSCHURA & PARTNER mbB

(57) ABSTRACT

A rotary encoder for providing a control signal in dependence upon an angular position of a controller rotatable about an axis of rotation. The rotary encoder includes a component for rotation with said controller about said axis of rotation. The rotary encoder also includes a radiation source and detector arrangement configured to direct radiation towards a target region and generate a detector signal dependent upon radiation reflected from within that target region. The rotary encoder further includes a computer processor configured to process said detector signal to determine a measure of distance or change of distance to a reflecting surface region within said target region, and to use said measure to provide said control signal. The component defines a reflecting surface that passes through said target region such that a reflecting surface region is present within
(Continued)

said target region with a distance that varies with the angular position.

22 Claims, 11 Drawing Sheets

(58) Field of Classification Search
CPC ... G01B 11/26; G01B 11/002; G03F 7/70775; H03M 1/287
See application file for complete search history.

(56) References Cited

U.S. PATENT DOCUMENTS

| | | | | |
|---|---|---|---|---|
| 4,956,553 A * | 9/1990 | Matsui | | G01D 5/38 250/237 G |
| 5,073,710 A * | 12/1991 | Takagi | | G01D 5/38 250/237 G |
| 5,428,217 A * | 6/1995 | Nakajima | | G01D 5/38 250/214 PR |
| 5,442,172 A * | 8/1995 | Chiang | | G01D 5/38 250/237 G |
| 6,246,050 B1 * | 6/2001 | Tullis | | G01D 5/347 250/231.13 |
| 6,803,560 B1 * | 10/2004 | Okumura | | G01D 5/38 250/231.16 |
| 7,061,624 B2 * | 6/2006 | Ishizuka | | G01D 5/366 356/521 |
| 7,265,336 B2 * | 9/2007 | Hataguchi | | G01D 5/34707 250/231.13 |
| 8,415,610 B2 * | 4/2013 | Nakajima | | G01D 5/347 250/231.16 |
| 8,546,744 B2 * | 10/2013 | Yoshida | | G01D 5/3473 250/231.13 |
| 9,244,438 B2 * | 1/2016 | Hoover | | G04C 3/004 |
| 9,797,752 B1 * | 10/2017 | Ruh | | G01D 5/3473 |
| 9,797,753 B1 * | 10/2017 | Gowreesunker | | G01B 11/26 |
| 10,066,970 B2 * | 9/2018 | Gowreesunker | | G01D 5/34715 |
| 10,145,711 B2 * | 12/2018 | Boonsom | | G01D 5/34715 |
| 10,145,712 B2 * | 12/2018 | Ruh | | G01D 5/35303 |
| 10,190,891 B1 | 1/2019 | Rothkopf et al. | | |
| 10,444,040 B2 | 10/2019 | Ruh | | |
| 11,015,960 B2 * | 5/2021 | Rothkopf | | G01D 5/34746 |
| 11,874,144 B2 * | 1/2024 | Lin | | G01D 5/34715 |
| 12,085,382 B2 * | 9/2024 | Liang | | G01D 5/2495 |
| 12,146,771 B2 * | 11/2024 | Thorburn | | G01D 5/344 |
| 2011/0069390 A1 * | 3/2011 | Yoshida | | G01D 5/38 427/164 |
| 2014/0306099 A1 * | 10/2014 | Oguchi | | G01L 3/08 250/225 |
| 2017/0248446 A1 * | 8/2017 | Gowreesunker | | G05G 9/047 |
| 2019/0317454 A1 | 10/2019 | Holenarispur et al. | | |
| 2020/0201256 A1 | 6/2020 | Tortora et al. | | |
| 2020/0271483 A1 * | 8/2020 | Boonsom | | G01D 5/347 |
| 2021/0181643 A1 * | 6/2021 | Liu | | G03F 7/70516 |
| 2024/0159573 A1 * | 5/2024 | Dantler | | G04G 21/00 |

FOREIGN PATENT DOCUMENTS

| | | | | |
|---|---|---|---|---|
| EP | 0978708 A1 * | 2/2000 | | G01D 5/3473 |
| EP | 3 015 925 A1 | 5/2016 | | |
| TW | 201804517 A * | 2/2018 | | G01B 11/27 |
| WO | WO-2008079577 A2 * | 7/2008 | | G01D 5/34707 |
| WO | WO-2011152076 A1 * | 12/2011 | | G01D 5/24438 |
| WO | 2019/156629 A1 | 8/2019 | | |

OTHER PUBLICATIONS

Written Opinion issued for corresponding International Patent Application No. PCT/SG2022/050143 on Jun. 17, 2022 (5 pages).

* cited by examiner

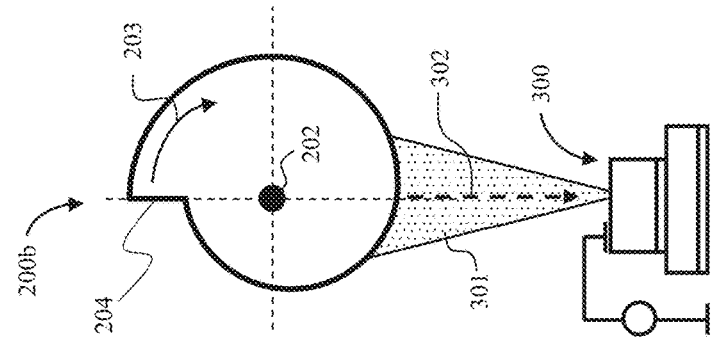
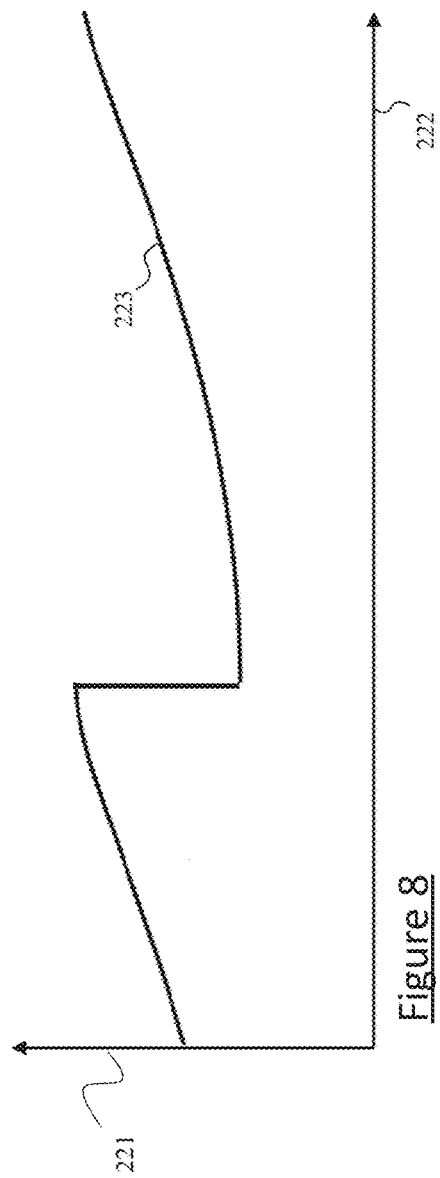
Figure 6
Figure 7
Figure 8

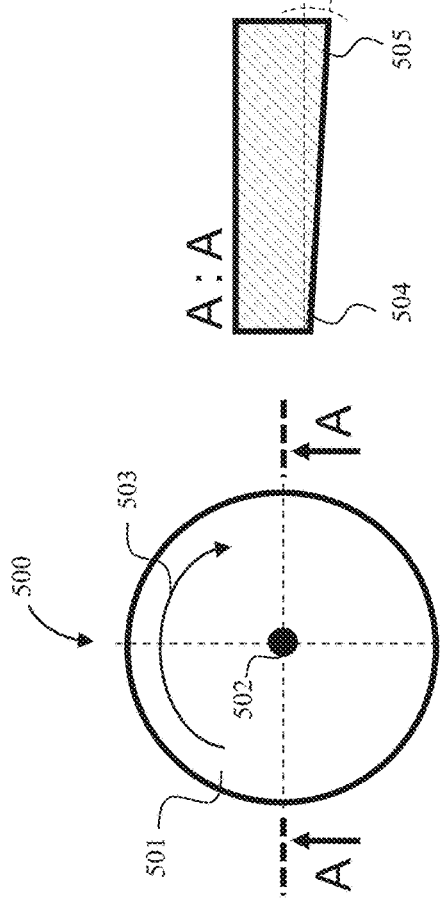
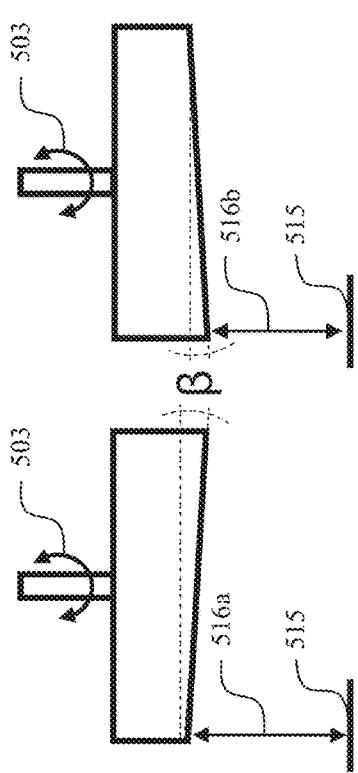
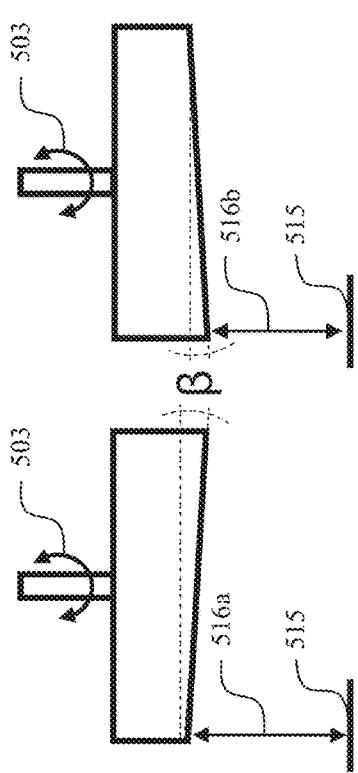
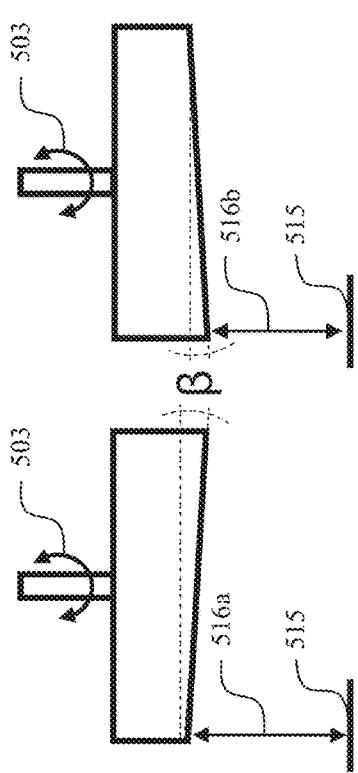
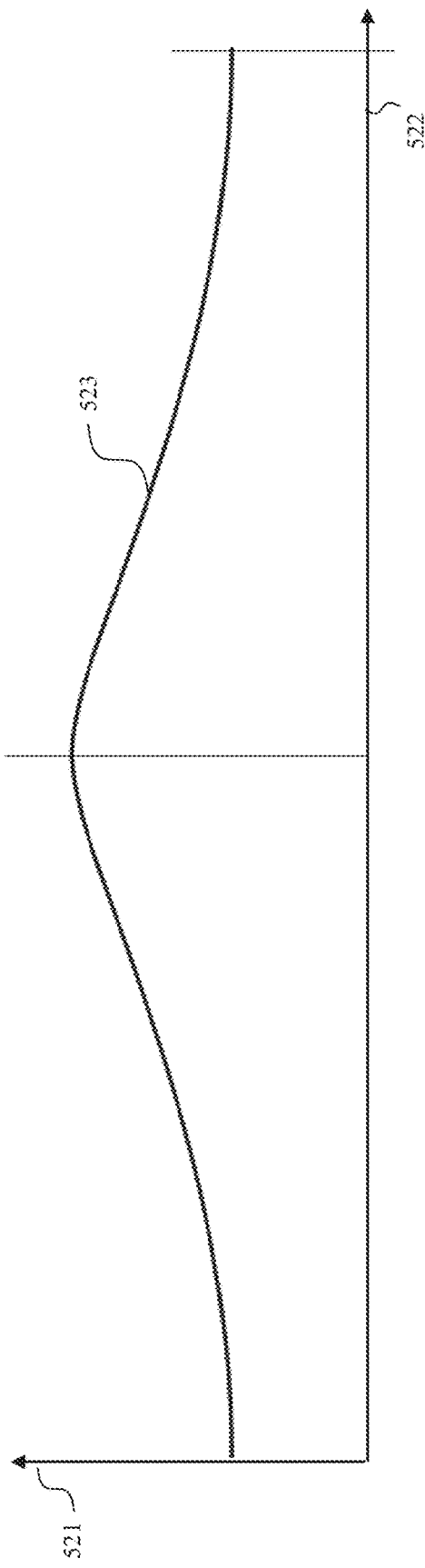

ROTARY ENCODERS

CROSS REFERENCE TO RELATED APPLICATION

This application is a National Stage of International Application No. PCT/SG2022/050143, filed on Mar. 16, 2022, which designates the United States and was published in English, and which claims priority to U.S. Provisional Patent Application No. 63/162,451, filed on Mar. 17, 2021, in the United States Patent and Trademark Office. All of the aforementioned applications are hereby incorporated by reference in their entireties.

TECHNICAL FIELD

The present invention relates to rotary encoders and in particular, though not necessarily, to rotary encoders for providing control signals in dependence upon the angular positions of watch crown mechanisms.

BACKGROUND

In the field of conventional mechanical watches, the "crown" of the watch is the button or knob that projects from an edge of the watch to allow the user to set the time and date and to control other functions. The crown is fixed to a "stem" or shaft which is the elongate tube that connects the crown to the internal mechanism. For the sake of brevity, the term "crown" as used hereinafter refers to the combination of the conventional crown and stem, unless stated otherwise.

Smartwatches are advanced iterations of the conventional watch and of course include many more features, typically implementing many of the functions of smartphones. However, common to many such smartwatches is the use of a crown-type knob to allow users to access and control functions. The advantage of the crown is that it allows not only control of certain "binary" type operations, e.g. on/off, with a simple button press, it can additionally be used to scroll through many function states by way of rotation. Rotation of the crown can therefore be used to set a time by scrolling through a range of numbers, to scroll through menu option, to zoom a camera feature, etc. FIG. 1 illustrates schematically the main body of a smartwatch 130 comprising a display 131 and a crown 110. Also illustrated are a series of Graphical User Interface (GUI) screens 132 that can be used to control the smartwatch in conjunction with the crown (and possibly other switches and knobs not shown in the drawing).

In order to perform the operations, the smartwatch must include a means for detecting the angular position of the crown about its axis of rotation as well as the position along the axis. This means may detect the absolute position as well as a speed of rotation. This means is commonly referred to as a "rotary encoder" (sometimes called a "shaft encoder"). The measurements that are obtained by a rotary encoder can be converted into an analogue or digital output for further processing. Rotary encoders can include one or more mechanical, optical, magnetic, and/or capacitive components. For example, a rotary encoder can be implemented as an electro-mechanical device. Of course, two factors critical for rotary encoders in the context of smartwatches are miniaturisation and cost.

FIG. 2 illustrates a system for (i) measuring the angular position and/or motion of a rotary shaft 102 coupled to the watch crown 110 via a stem 111, and (ii) detecting a longitudinal movement of the rotary shaft 102. The system 150 includes an optical rotary encoder system 100, a computer system 154, and a display 131 that is controlled by display control signals 156 provided to it by the computer system 154. The system 150 can be used, for example, to control an electronic device such as a smartwatch.

An end view of the rotary shaft 102 is shown in inset A from which it can be seen that a multiplicity of grooves 104 are formed coaxially along the length of the shaft. The rotary encoder 100 includes a system 101 having at least one light generating element 105 operable to generate light, and a pair of light detecting elements 106a,106b operable to detect light and convert the detected light into a signal. It will be readily apparent that rotation of the control knob 110 results in a corresponding rotation of the rotary shaft 102 causing a modulation of the light 108a,108b reflected towards the light detecting elements. Electrical signals 155 generated by the light detecting elements 106a,106b are provided to the computer system 154, allowing the computer system to demodulate the signals and thereby detect a rotation and position of the rotary shaft 102 about its axis 111a.

The system 150 includes a switching contact mechanism 152 (e.g., a push button mechanism) positioned proximate to the end of rotary shaft 102. Further, the system includes a spring element 151 that biases the rotary shaft 102 away from a switching contract mechanism 152. When a user is not pressing the control knob 110, the rotary shaft 102 is positioned away from the switching contact mechanism 152, and the switching contact mechanism 152 remains electrically open. When the user presses the control knob/crown 110 inward (e.g., in the direction of arrow 158), the rotary shaft 102 presses against the switch contact mechanism 152, and causes the switching contact mechanism 152 to electrically close. The computer system 154 can detect the opening and closing of the switch contact mechanism 152 by monitoring (e.g., via wires or a flexible printed circuit board) control signal 153, and control the operation of the electronic device 130 accordingly.

WO2019156629A1 describes an improvement upon the rotary encoder of FIG. 1 and which involves replacing the switching contact mechanism 152 by introducing a further marking around the rotary shaft 102 at a given axial position. This lies outside of the illuminated region of the shaft when the control knob 110 is in its resting position. However, when the knob is depressed, the further marking moves into this illuminated region and produces a modulation of the reflected light that is detectable by the light detecting elements 106a,106b and the coupled computer system 154. The marking may be, for example, a dark band that contrasts with a reflective metallic surface of the rest of the rotary shaft. The rotary encoder of WO2019156629A1 reduces the overall component count and therefore offers the possibility of reduced cost.

US20190317454A1 also describes a rotary encoder suitable for a smart watch. The approach relies upon the coherent mixing of light reflected from the watch's rotary shaft with the source light to detect rotation of the shaft.

Known rotary encoders such as those discussed above are relatively complicated as they use many components, such as one or more light sources and one or more light receiving elements, which need to be precisely aligned with respect to one another. The construction in particular of a rotary shalt with precise markings can be highly complicated as well as expensive.

SUMMARY

Various aspects of the invention are set out in the appended claims.

The reflecting surface is a substantially continuous and smooth surface, such that the direction changes in a continuously increasing or decreasing direction depending upon a direction of rotation of the component. However, one or a small number of features may be provided in the surface to provide discontinuities in the surface to act as markers.

BRIEF DESCRIPTION OF THE DRAWINGS

FIGS. 6 and 7 illustrate alternative rotary encoders;
FIG. 8 illustrates an angular position versus distance profile of the rotary encoder of FIG. 7;
FIGS. 13a-d illustrate a further rotary encoder;
FIG. 14 illustrates an angular position versus distance profile of the rotary encoder of FIGS. 13a-d.

DETAILED DESCRIPTION

Figure 1:
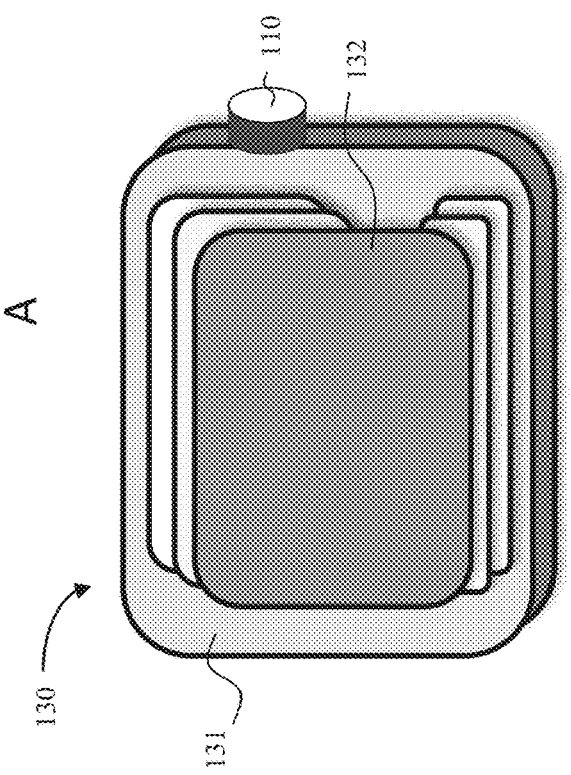
FIG. 1 illustrates schematically a smartwatch.
Figure 3:
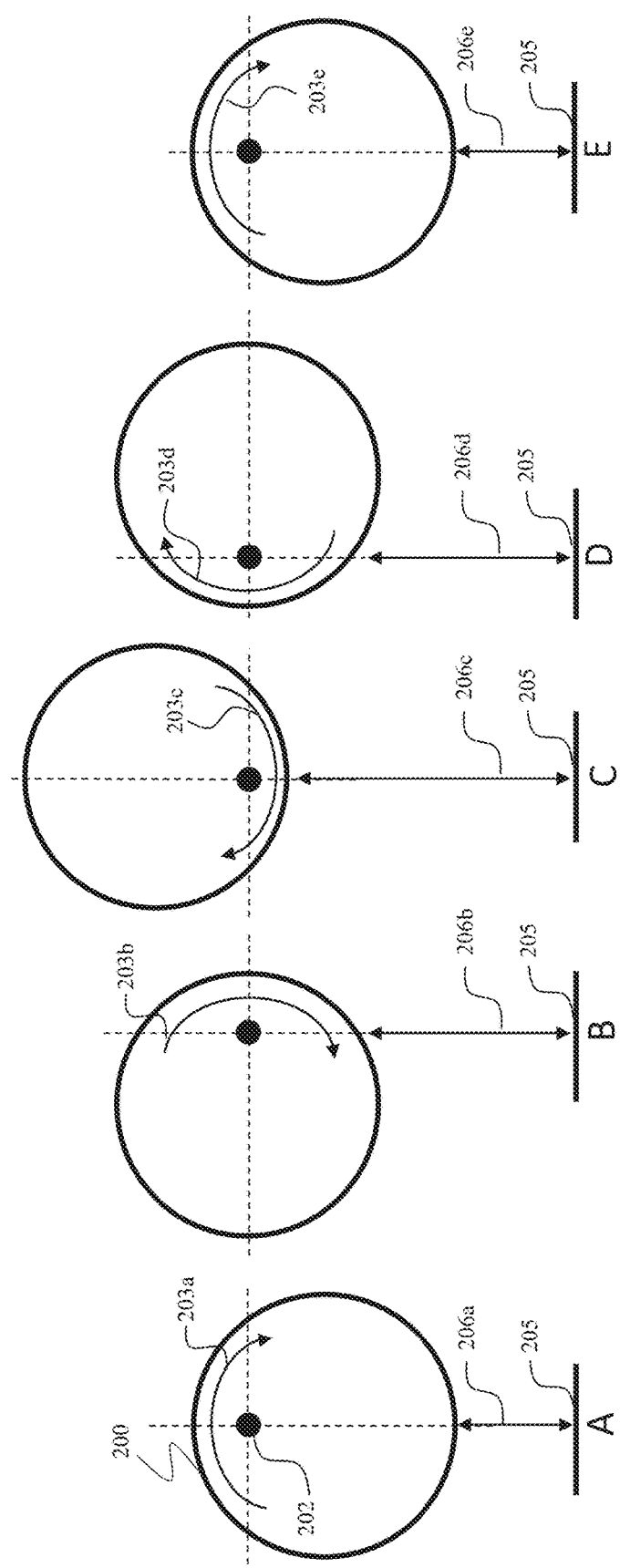
FIGS. 3A-E illustrates positions of a rotary encoder.
Figure 4:
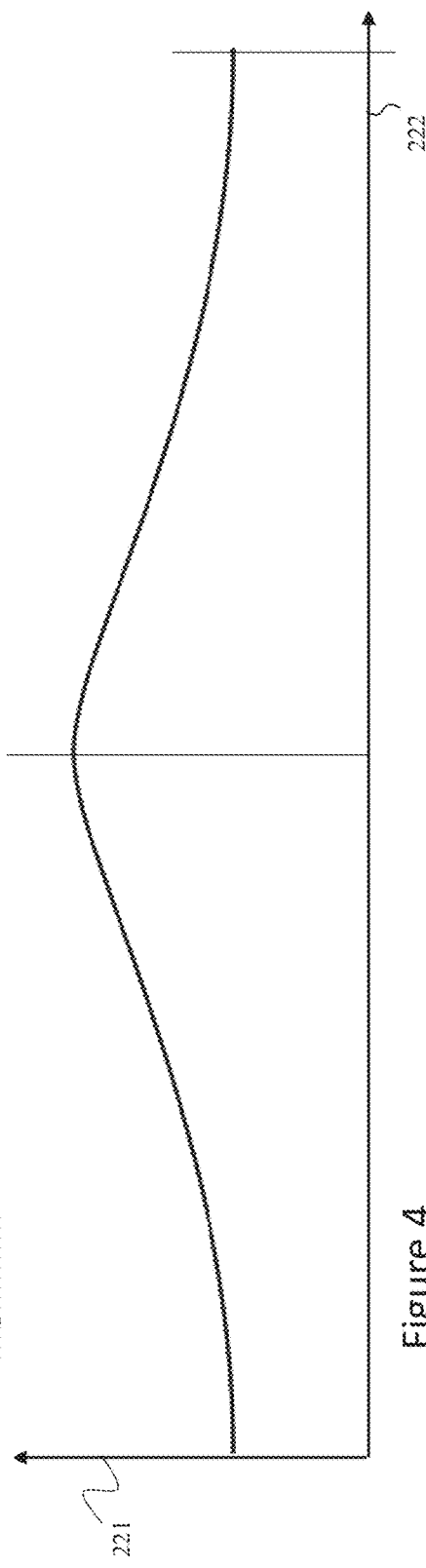
FIG. 4 illustrates an angular position versus distance profile of the rotary encoder of FIG. 3.
Figure 5:
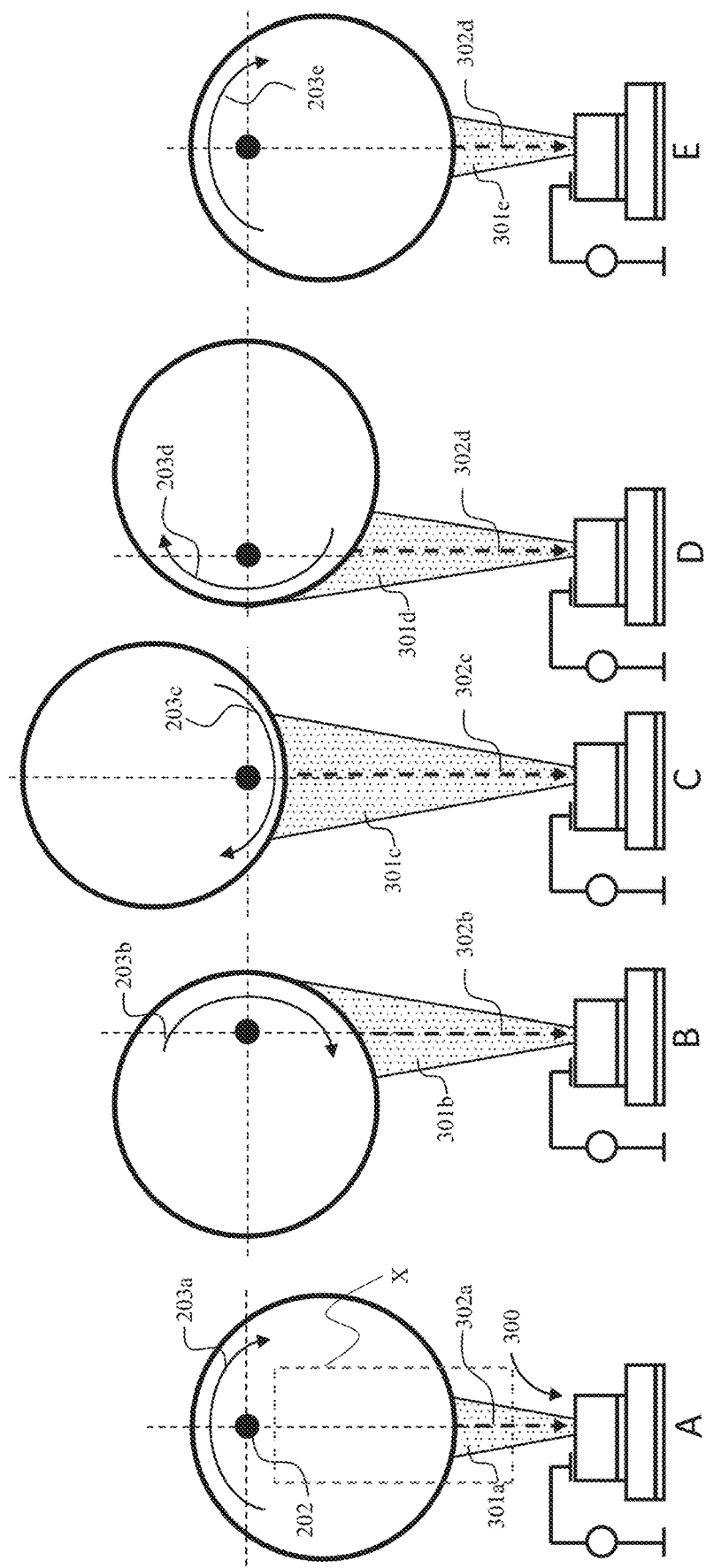
FIG. 5 again illustrates positions of a rotary encoder with illuminating light beam.

With reference to the general smartwatch construction of FIG. 1, an improved rotary encoder will now be described which relies upon the principle of a component mounted eccentrically with respect to the axis of rotation of the knob or crown 110. The underlying principle is illustrated in FIGS. 3A-E, which illustrate a sequence of rotational positions of an eccentric component 200, in this case a cylinder, as viewed end on, with the axis of rotation of the knob identified by reference numeral 202 and extending into the page. The axis 202 remains fixed of course. Reference numeral 205 indicates the position of the light source and detector arrangement, whilst the numerals 206a to 206e point to a distance between the position 205 and the illuminated surface of the eccentric component, assuming that light from the light source is directed "vertically" towards the axis 202. As the eccentric component 200 is rotated (clockwise in the sequence from left to right in the Figures), this distance varies. Reference numerals 203a to 203e indicate the direction of rotation about the axis 202. FIG. 4 plots the change in distance (206a to 206e) on the y-axis 221 versus angular position on the x-axis 222 (0 to 360 degrees). The measured distance, whether that be a direct or an indirect measure (i.e. a signal that varies with distance), can be used to provide a control signal.

It will be appreciated that by measuring the distance 206, or rather a parameter or parameters dependent upon the distance, the angular position of the knob 110 can be directly determined. This is further illustrated in the sequence of FIGS. 5A-E which show the light source and detector arrangements 300 (located at the position 205), the light 301a-e emitted towards the eccentric component 200, and the light 302a-e reflected from the eccentric component 200. Identifier "X" indicates a target region towards which the light is directed.

It will be further appreciated that the eccentric component need not be a circular cylinder but may have other cross-sections. FIG. 6 illustrates for example a component 200a having an elliptical cross-section mounted eccentrically relative to the axis of rotation 202. The distance versus angular position profile for this arrangement has a shape similar to that of the circular cylindrical component shown in FIG. 4. FIG. 7 illustrates a still further example of an eccentric component 200b, the component having a circumference that follows a generally spiral path which returns from an innermost point to an outermost point at a face 204 that lies in an axial plane relative to the axis of rotation 202. FIG. 8 illustrates the distance versus angular position profile for this arrangement from which it can be seen that, assuming a clockwise rotation, the profile consists of regions of increasing distance 223 separated by a sharp (virtually instantaneous) change. An advantage of the arrangement of FIG. 7 is of course that it is possible to determine a direction of rotation (clockwise or anticlockwise) by observing the direction of change of the slope. An increasing distance indicates a clockwise rotation whilst a decreasing direction indicates an anticlockwise rotation. The sharp change in profile provides a "reset" position that can be used to correct for drift over other areas of the profile.

Figure 11:
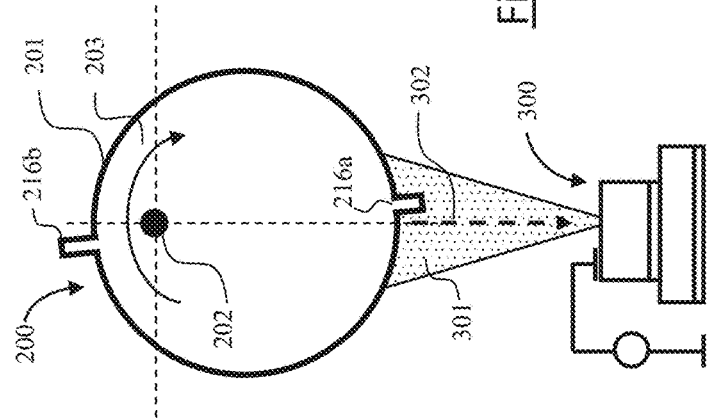
FIG. 11 illustrates a rotary encoder with ridges.
Figure 12:
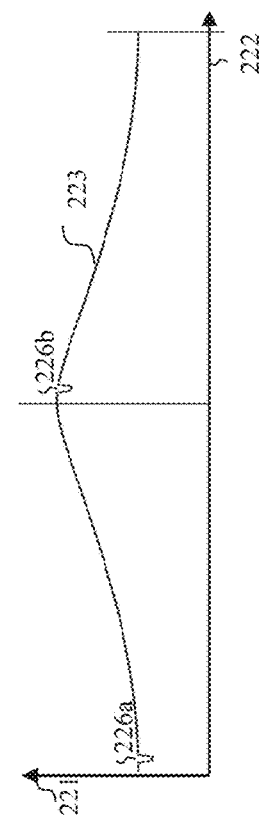
FIG. 12 illustrates an angular position versus distance profile of the rotary encoder of FIG. 11.
Figure 9:
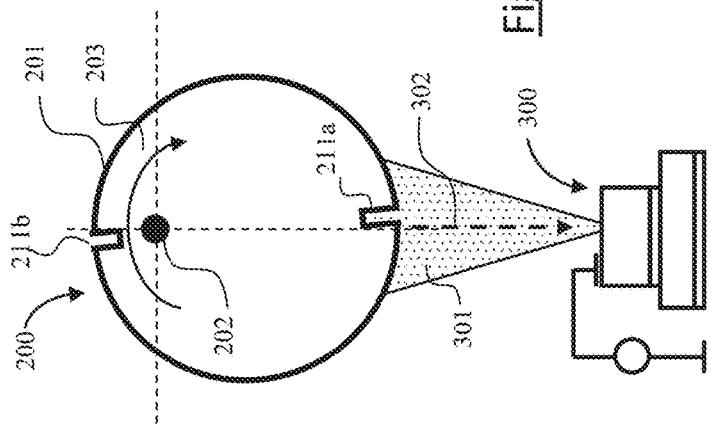
FIG. 9 illustrates a rotary encoder with notches.
Figure 10:
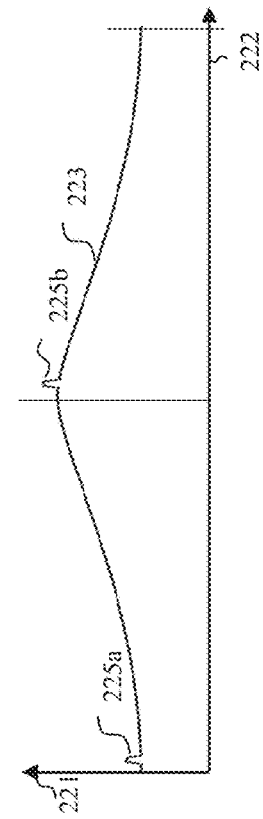
FIG. 10 illustrates an angular position versus distance profile of the rotary encoder of FIG. 9.

FIG. 9 illustrates a still further embodiment of the eccentric component 200. In order to allow a direction of rotation to be determined, the component is provided with a pair of diametrically opposed notches 211a,211b. These extend coaxially along the length of the component, or at least over a portion that is illuminated by the light source. The notches are offset slightly around the circumference from the maximum and minimum distance points of the component (measured relative to the light source and detector arrangement 300). The offsets are further illustrated by the distance versus angular profile shown in FIG. 10, where the distance measured to the notches are identified by numerals 225a and 225b. Assuming that the knob 110 is at a position corresponding to the maximum distance, it can be determined whether a subsequent rotation is in a clockwise or anticlockwise direction by observing whether a change in the detection signal indicative of the passage of the notch 211b exists. If yes, the rotation is clockwise and if not it is anticlockwise. Similarly for the case where the starting position of the knob is at a position corresponding to the minimum distance. Of course, for movements between positions intermediate the maximum and minimum distances, direction can be determined by analysing the slope of the determined change in distance. FIGS. 11 and 12 illustrate a similar arrangement but where the direction indication is facilitated by projections 216a,216b from the eccentric component 200 rather than by notches.

Figure 2:
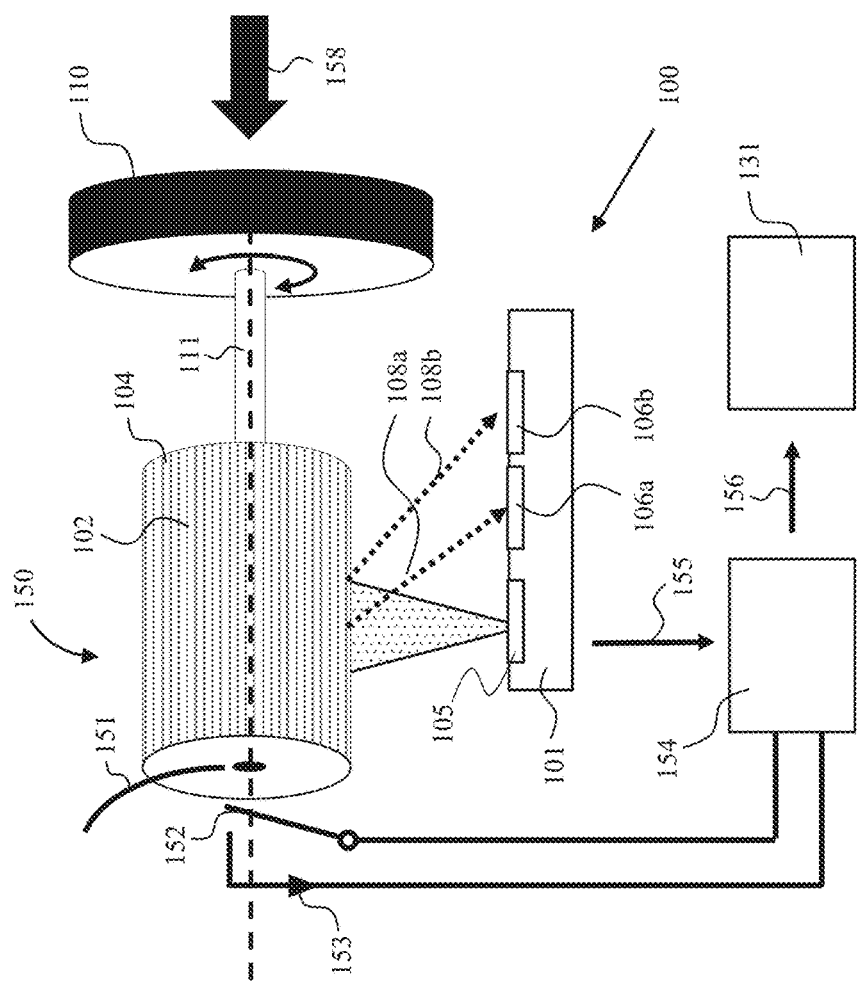
FIG. 2 illustrates schematically a known rotary encoder.

As has already been discussed above, it is desirable or even necessary to be able to detect movement of the knob or crown 110 along the axis of rotation 202 as well as around that axis. A conventional electromechanical arrangement was described with reference to FIG. 2. It is also known to use visible markings on the rotary shaft 102 that can be detected by optical means to indicate such an axial movement. Such visible markings can be provided around the eccentric components described with respect to FIGS. 3A-E to 12 such that they are detected by the light source and detector arrangement 300 upon axial movement of the eccentric components.

The arrangements described above rely on measuring a distance to a circumferential edge of a component mounted eccentrically with respect to a rotation axis. FIGS. 13a-d illustrate an arrangement that employs an alternative approach, namely providing an end face of a component 500 that lies in a plane at an angle β offset from a plane transverse to the axis of rotation. Whilst FIG. 13a illustrates an end view, i.e. along the axis of the component, FIG. 13b illustrates an axial cross-sectional side view of the component on A-A, and FIGS. 13c and 13d show side views of the component in first angular position and a second angular position being 180 degrees rotated relative to the first angular position. In this arrangement the light source and detector arrangement are located at a position 515 that is axially spaced from the (innermost) end of the component 500. The light source and detector arrangement directs a beam of light in a substantially coaxial direction so that it is incident on and is reflected from the end of the component. As the component rotates, the distance between the light source and detector arrangement and the end of the component varies smoothly, as illustrated by the profile of FIG. 14. FIGS. 13c and 13d illustrates the distances 516a,516b measured for the two illustrated angular positions of the component 500.

Figure 15A:
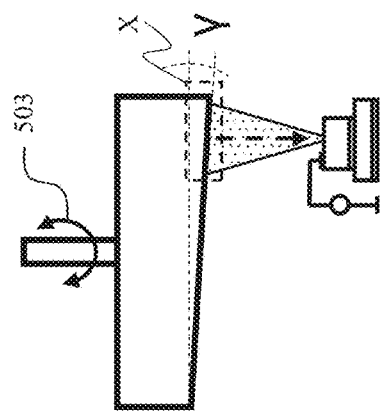
FIGS. 15a-b illustrate further rotary encoders.
Figure 15B:
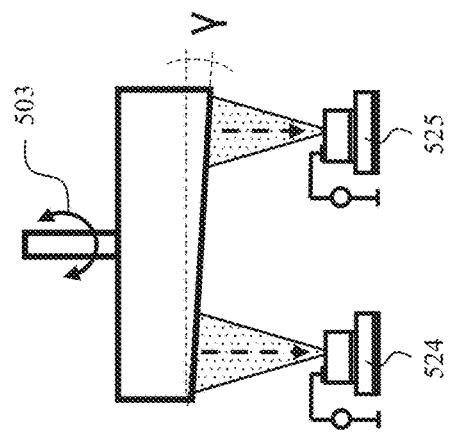
Figure 16:
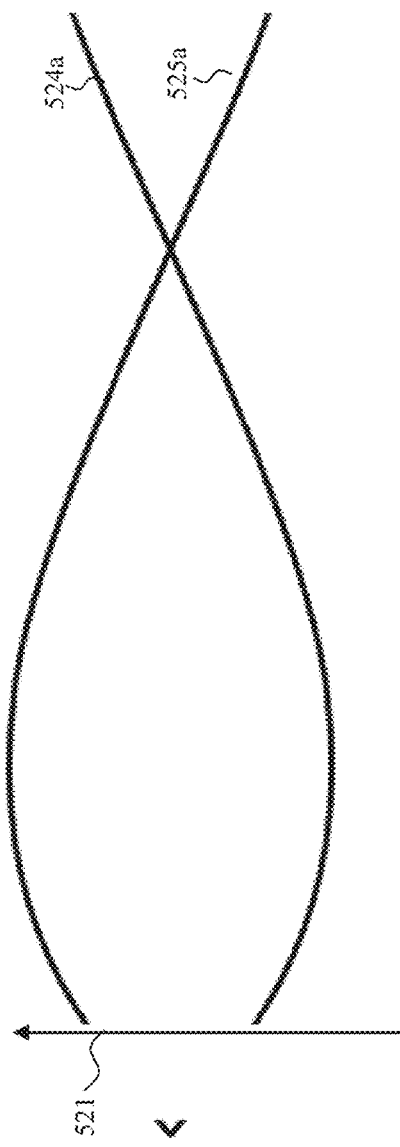
FIG. 16 illustrates an angular position versus distance profile of the rotary encoder of FIG. 15b.

FIG. 15a illustrates a light source and detector arrangement for the embodiment of FIGS. 13a-d and which uses a single arrangement providing a single distance measurement. FIG. 15b illustrates an alternative light source and detector arrangement which utilises a pair of such arrangements providing a pair of distance measurements, with the target region for the light beam indicated by "X". The resulting profiles are illustrated in FIG. 16. The use of a pair of light source and detector arrangements provides for redundancy and therefore increased reliability and security.

Figure 17:
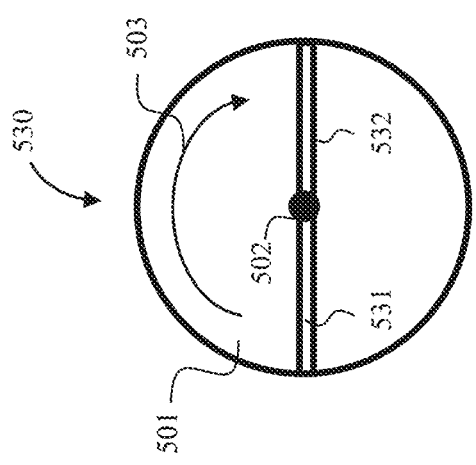
FIG. 17 illustrates a further rotary encoder.
Figure 18:
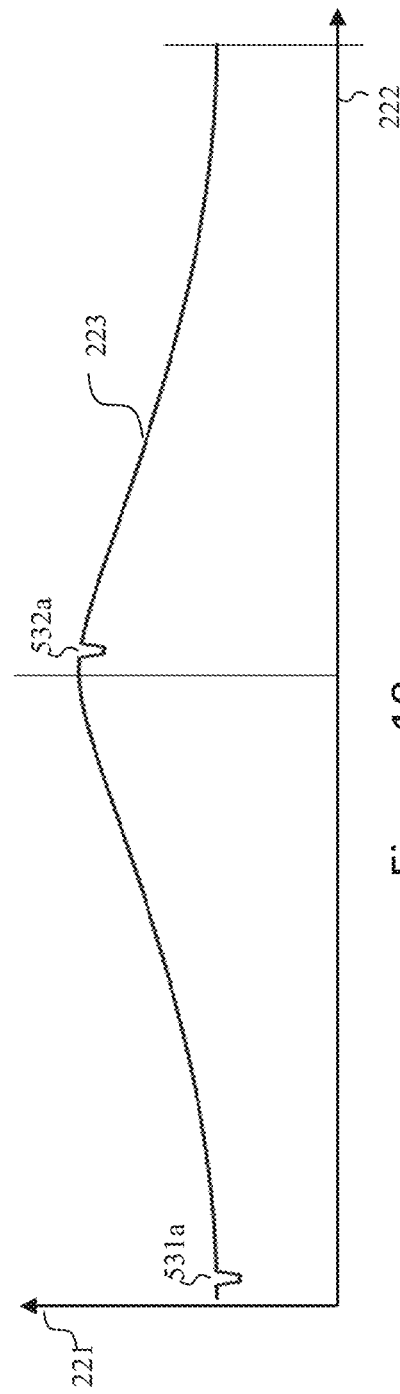
FIG. 18 illustrates an angular position versus distance profile of the rotary encoder of FIG. 17.

FIG. 17 illustrates, by way of an end-on view, a modification of the arrangement of FIGS. 13a-d which relies upon a similar end profile with the addition of a notch (composed of notch parts 531,532) extending across the end, diametrically when viewed axially. This results in the distance versus angular position profile shown in FIG. 18 and which includes sections 531a and 532a to one side of the minimum and maximum distances respectively. As with the embodiment of FIG. 9, this arrangement allows a determination of the rotation direction to be made.

Figure 19C:
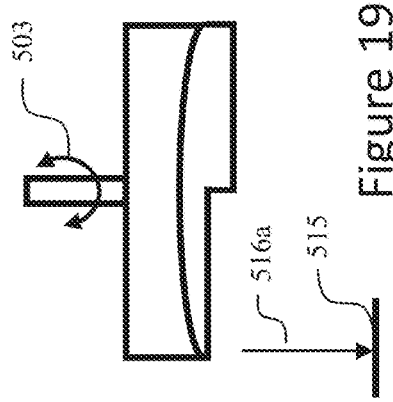
FIGS. 19a-c illustrate a further rotary encoder.
Figure 19B:
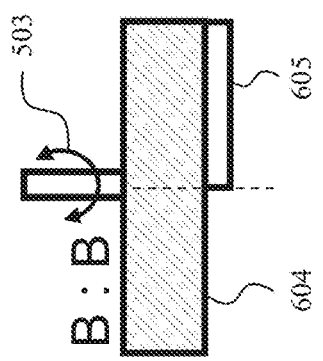
Figure 19A:
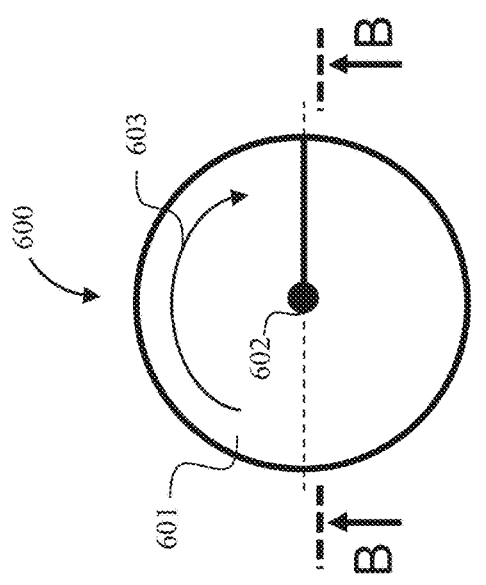
Figure 20:
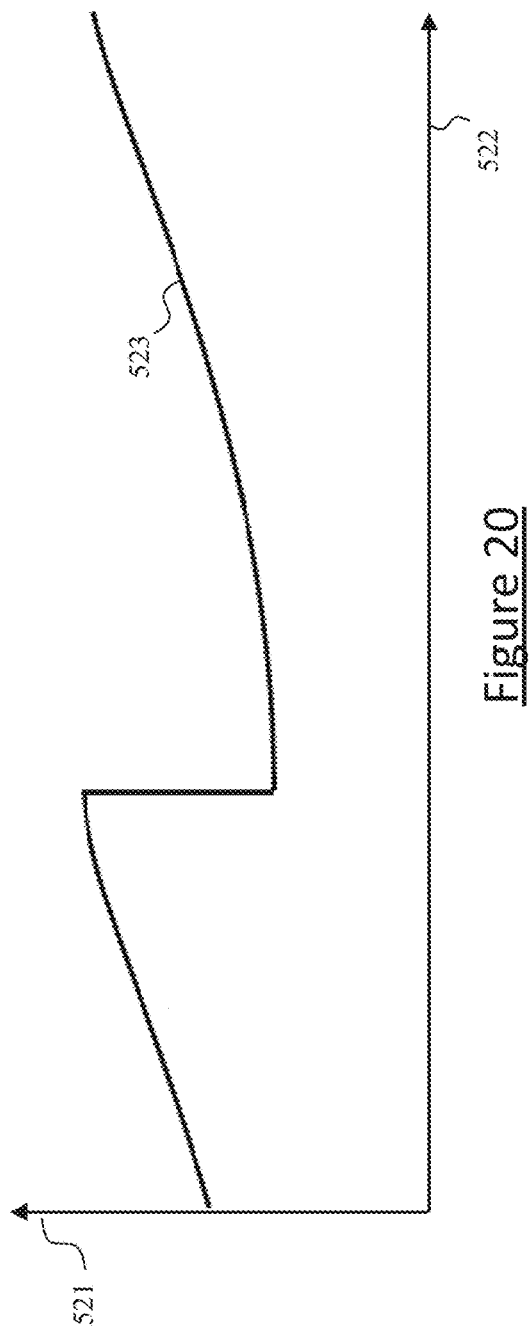
FIG. 20 illustrates an angular position versus distance profile of the rotary encoder of FIGS. 19a-c.

FIG. 19a is an end view of a further arrangement that allows for detection of the end profile, whilst FIG. 19b shows a cross-sectional view on B-B. FIG. 19c shows a side view of the arrangement. This arrangement is analogous to that of FIG. 7 in that the distance profile, illustrated in FIG. 20, is continuously varying in a single (axial direction), except for a step change 605 that provide a substantially diametrically extending face in the end. As with the arrangement of FIG. 7, this arrangement allows for a determination of the rotation direction to be made by analysing the slope of the change in direction.

The rotary encoders described above are well suited to use in smartwatches where miniaturisation of the encoders is desired. The measure of distance derived, be that a direct measure or an indirect measure, can be used as or to derive a control signal for the smartwatch. The described rotary encoders can find application in other areas of course, including but not limited to conventional electromechanical watches and smartphones.

Considering now light source and detector arrangements suitable for use with the embodiments described above, these may rely on SMI (self-mixing interference). This is a well-known technique in which light is emitted from a resonant light source (having an optical resonator in which the light circulates), e.g., a laser, with reflected (or scattered) light being fed-back into the resonator. The feed-back light interacts with the light in the resonator or, more precisely, it introduces a disturbance in the light source by interference. This effect can be sensed and can be related to the interaction with the object, such as to a distance to the object or a velocity of the object (relative to the light source/resonator exit mirror). By calibration, it is possible to map an output signal of the SMI arrangement to a distance. SMI-based sensors can be made very compact and therefore small, and make possible absolute distance and velocity measurements. VCSELs (vertical-cavity surface emitting lasers) can be used for SMI, which can be made very small and cost-efficient.

Considering this approach in more detail, the intensity of light output by the VCSEL various sinusoidally as the distance between the resonator and the target changes. Consequently, the output of the detector will also vary sinusoidally. A measure of change of distance can be obtained by counting the number of fringes (peaks and troughs) in the output signal.

Figure 21D:
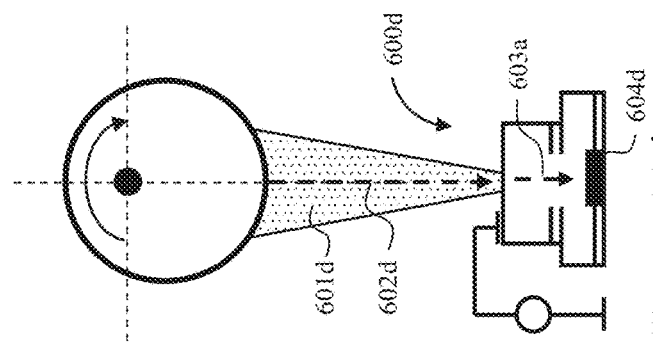
FIGS. 21a-d illustrate various light source and detector arrangements.
Figure 21C:
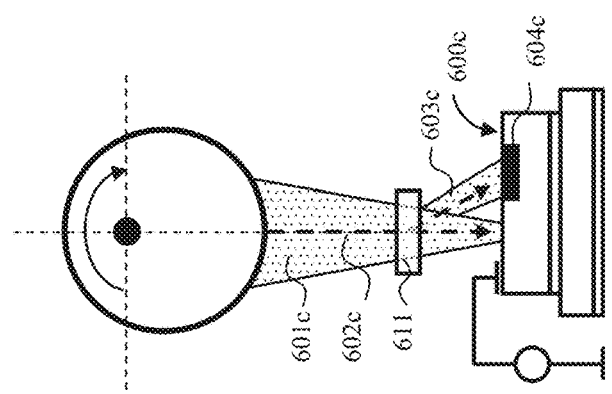
Figure 21B:
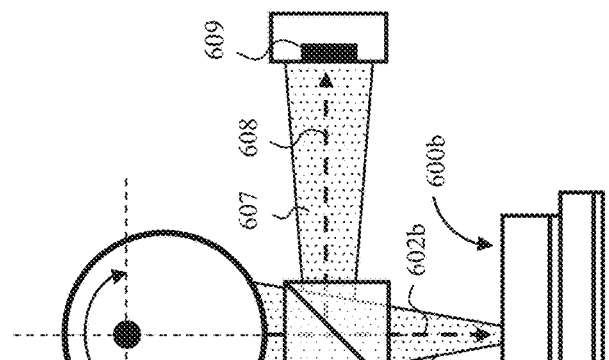
Figure 21A:
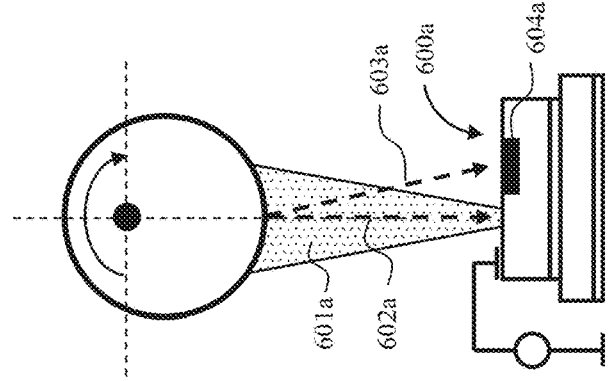

Various means to determine the distance to the reflecting/scattering surface are illustrated in FIGS. 21a to 21d:

FIG. 21a. Light emitted by the VCSEL, by way of reflection from the target, is detected using a photodiode 604a. The intensity of the emitted light, indicated by the output current of the photodiode, can be correlated with distance.

FIG. 21b. A beam splitter 606 can be positioned close to the exit mirror to pass most of the light exiting the exit mirror and reflect a small portion thereof to a photodetector 609. Again, detected light intensity can be correlated with distance.

FIG. 21c. A cover glass 611 is located between the light source and the target so that a portion of the emitted light is reflected back from the cover glass to the detector 604c.

FIG. 21d. A photodetector 604d is located directly beneath the VCSEL to detect light generated within the resonator.

Alternative arrangements for detecting a measure of distance may involve monitoring a drive signal for the light source, e.g.,
  1) the light source is driven with constant current, and a change in voltage is determined; or
  2) the light source is driven with a constant voltage, and a change in current is determined.

The electrical signal may however be noisier than an optically obtained signal (FIGS. 21a-d).

Figure 22B:
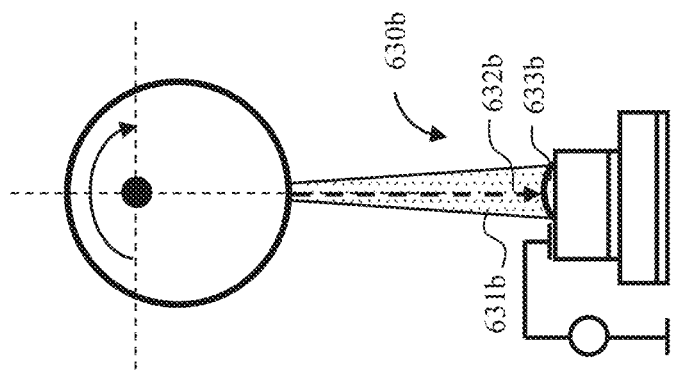
FIGS. 22a-b illustrate different VCSEL arrangements.
Figure 22A:
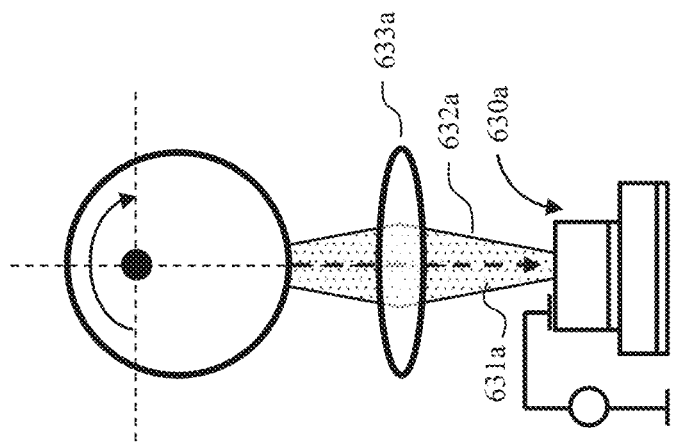

It will be appreciated by the person of skill in the art that various modifications may be made to the above described embodiments without departing from the scope of the present invention. These may include, by way of example:
  Operating the laser at any wavelength from UV to IR;
  Using an edge emitter laser EEL, VCSEL, quantum dot laser QDL or quantum cascade laser QCL;
  In case of a VCSEL, the VCSEL can be front side or back side emitting VCSEL;
  In case of VCSEL, a lens 633a can be added in order to focus the beam or collimate the beam on the disc or shaft as illustrated in FIG. 22a, or a lens 633b can integrated onto the VCSEL itself using a back side emitting VCSEL (FIG. 22b).

It will be further appreciated that the light source (and detector) may be replaced by any other suitable radiation source and detector, for example operating in the visible of non-visible spectra, e.g. infra-red, ultra-violet.

TABLE OF REFERENCE NUMERALS

100 Optical rotary encoder
101 System/light source and detector arrangement
102 Rotary shaft
104 Grooves
105 Light generating element
106a, 106b Light detecting elements
108a, 108b light beams
110 Crown/control knob
111 Stem
111a axis of rotation
130 Smartwatch
131 Display
132 GUIs
150 System
151 Spring element
152 Switching contact mechanism
153 Control signal
154 Computer System
155 Electrical signals
158 Directional arrow
200 Eccentric component
201 Wheel/Shaft
202 Axis of rotation
203a-e Direction of rotation
205 Light source and detector arrangement location
206a-e Distance to surface/element
211a Notch/marking on wheel/shaft
211b Notch/marking on wheel/shaft
221 axis distance of the wheel/shaft to the surface/element
222 axis the rotation of the wheel/shaft in e.g. degrees
223 graph
230 Push length
231 Distance before push
232 Distance at cut
233 Distance at end of push
300 System
301 Emitting radiation
302 Incident radiation
400 System
400'System in side view
400a System after push
401 Wheel/Shaft
402 Rotation point
403 Rotation
404 Offset shaft and rotation point
410 Wheel/Shaft extension
420 System
421 Wheel/Shaft Cone/Frustum
422 Angle a
430 System
431 Wheel/Shaft
432 Cut
500 System
501 Rotating Disk
502 Rotation point
503 Rotation
504 Thinnest part of the disk
505 Thickest part of the disk
515 Surface/Element
516a Distance to surface/element
516b Distance to surface/element
521 axis distance of the disk to the surface/element
522 axis the rotation of the disk in e.g. degrees
523 graph
524 System 1
524a graph system 1
525 System 2
525a graph system 2

-continued

530 System (with Notch)
531 Notch/marking on disk just after the thinnest part of the disk
532 Notch/marking on disk just after the thickest part of the disk
600 System
601 Emitting radiation
602 Incident radiation
603 Incident radiation which goes into radiation receiving element
604 Radiation receiving element (e.g. photodiode)
606 Beam splitter
607 Emitting radiation after beam splitter
608 Incident radiation after beam splitter
609 Radiation receiving element (e.g. photodiode)
611 Cover glass
630 System
631 Emitting radiation
632 Incident radiation
633 Lens

The invention claimed is:

1. A rotary encoder for providing a control signal in dependence upon an angular position of a controller rotatable about an axis of rotation, the rotary encoder comprising:
a component for rotation with said controller about said axis of rotation, wherein said component is substantially in the form of a circular or elliptical cylinder having an axis of rotation that is offset from a central longitudinal axis of said component;
a radiation source and detector arrangement configured to direct radiation towards a target region and generate a detector signal dependent upon radiation reflected from within that target region;
a computer processor configured to process said detector signal to determine a measure of distance or change of distance to a reflecting surface region within said target region, and to use said measure to provide said control signal, wherein the distance or the change of distance is measured in a direction perpendicular the central longitudinal axis of the component,
wherein said component defines a reflecting surface that passes through said target region such that the reflecting surface region is present within said target region with a distance that varies with the angular position of the component about said axis.

2. The rotary encoder according to claim 1, wherein said radiation source and detector arrangement is configured to direct radiation towards said target region in a direction substantially perpendicularly with respect to said axis, and said reflecting surface of the component extends around a circumferential region of the component.

3. The rotary encoder according to claim 2, wherein said component provides the reflecting surface as a spiral surface around the axis of rotation.

4. The rotary encoder according to claim 2 wherein said reflecting surface comprises one or more features defining a discontinuity or discontinuities in said distance with rotation of the component about said axis.

5. The rotary encoder according to claim 4, wherein the or each feature is provided by a groove or ridge extending substantially parallel to said axis of rotation.

6. The rotary encoder according to claim 1, wherein said radiation source and detector arrangement is configured to direct radiation towards said target region in a direction substantially parallel to said axis, and said reflecting surface is provided by a substantially transverse end region of the component.

7. The rotary encoder according to claim 6, wherein said transverse end region is in a plane that is offset from a plane perpendicular to said axis.

8. The rotary encoder according to claim 6, wherein said transverse end region presents a spiral reflecting surface.

9. The rotary encoder according to claim 6, wherein said reflecting surface comprises one or more features defining a discontinuity or discontinuities in said distance with rotation of the component about said axis.

10. The rotary encoder according to claim 9, wherein the or each feature is a ridge or groove extending from said axis in a principally radial direction with respect to said axis.

11. The rotary encoder according to claim 1, wherein said radiation source and detector arrangement comprises a radiation source and a radiation detector.

12. The rotary encoder according to claim 11, wherein said radiation source and said radiation detector are substantially co-located.

13. The rotary encoder according to claim 11, wherein said radiation source and said radiation detector are provided at spaced apart locations, and the rotary encoder comprises a means for diverting radiation to the radiation detector.

14. The rotary encoder according to claim 11, wherein said radiation detector is a photodiode.

15. The rotary encoder according to claim 1, wherein said distance is a distance from said radiation source to said reflecting surface region.

16. The rotary encoder according to claim 15, wherein said radiation source is a VCSEL.

17. The rotary encoder according to claim 1, wherein said radiation source and detector arrangement is a source and detector arrangement for one or more of visible light, infra-red radiation, and ultra-violet radiation.

18. A watch comprising a rotary encoder according to claim 1, said controller being a crown of the watch.

19. The watch according to claim 18, the watch being a smart watch and said computer processor being configured to use a determined measure of distance or change of distance to control one or more functions of the smartwatch.

20. A method of providing a control signal in dependence upon the angular position of a controller rotatable about an axis of rotation, method comprising:
  causing a component coupled to said controller to be rotated with said controller about said axis of rotation, wherein said component is substantially in the form of a circular or elliptical cylinder having an axis of rotation that is offset from a central longitudinal axis of said component;
  directing a beam of radiation towards a target region and generating a detector signal dependent upon radiation reflected from within that target region;
  using said detector signal to determine a measure of distance or change of distance to a reflecting surface region within said target region, wherein said component defines a reflecting surface that passes through said target region such that the reflecting surface region is present within said target region with a distance that varies with the angular position of the component about said axis; and
  using said measure to provide said control signal,
  wherein the distance or the change of distance is measured in a direction perpendicular the central longitudinal axis of the component.

21. The method according to claim 20, wherein said distance is a distance from a radiation source or a radiation detector of the radiation source and radiation detector arrangement.

22. The method according to claim 21, wherein said radiation source is a VCSEL and said radiation detector is a photodiode.

* * * * *